Jan. 23, 1940.  H. JUNGHANS  2,188,048
MECHANICAL TIME FUSE CASING
Filed Oct. 14, 1937
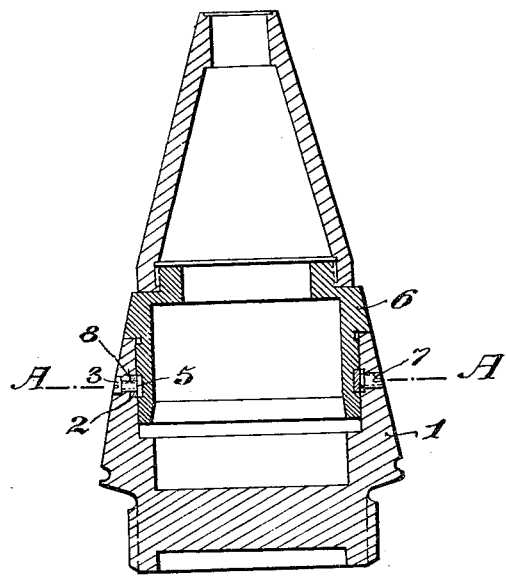
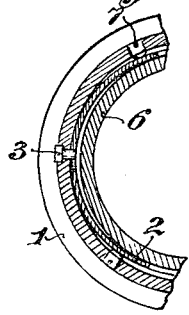 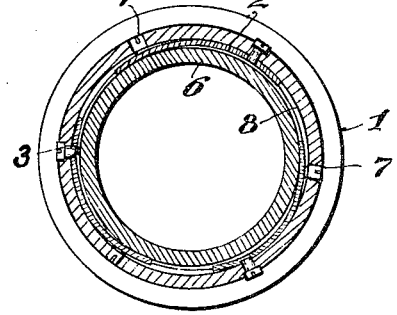
Inventor:
Helmut Junghans
By Young, Emery & Thompson
Attorneys Patented Jan. 23, 1940

2,188,048

UNITED STATES PATENT OFFICE 2,188,048

MECHANICAL TIME FUSE CASING

Helmut Junghans, Schramberg-Sulgen, Germany

Application October 14, 1937, Serial No. 169,041
In Germany July 23, 1936

5 Claims. (Cl. 102—36)

This invention relates to a casing for fuses, and more particularly mechanical time fuses.

The casings of fuses, and more particularly mechanical or other time fuses, usually comprise two interengaging parts, of which the one is firmly connected to the projectile, for example the body of a shell, whilst the other is rotatably mounted on the fixed portion for the purpose of adjustment of the fuse by means of the rotatable portion, for example for delayed action.

Heretofore there has frequently been employed as connecting means for this purpose a wire ring, which is fitted in the form of a spring ring in the lower fixed portion and engages in a corresponding groove in the rotatable upper portion. To permit of a proper adjustment of the fuse it is necessary to be able to vary the self-holding action of the parts, i. e., the resistance occurring upon the relative rotation of the parts of the casing. Accordingly in the known embodiments making use of a wire ring there are provided radial screws, with the assistance of which it is possible to exert a greater or smaller pressure on the ring from the outside as desired, so that it is then pressed against the other part with a correspondingly greater or smaller degree of friction. Arrangements of this kind, however, have not been found to be satisfactory, as the specific surface pressure upon the pressing of the steel wire of circular cross-section against the casing, which usually consists of aluminium, is too high. The desired gentle, yielding grip upon the rotation is not obtained, and to the contrary the soft surface of the casing is attacked upon the rotation of the steel wire.

It is the object of the invention to eliminate this drawback, and this is accomplished by the fact that in a fuse casing, more particularly for mechanical time fuses, the said casing comprises two interengaging parts, of which the one is firmly connected to the projectile, whilst the other is rotatably mounted on the fixed portion for the purpose of adjustment of the fuse, the connecting means between the two parts consisting of flat springs which are provided on one of the two parts and engage resiliently in an annular groove or grooves in the other part.

According to an additional feature of the invention, oppositely disposed annular grooves may be provided in both parts of the casing, and in the annular space thus formed there may be located flat springs extending in each case beyond a portion of the periphery of the ring.

Further, the springs may be secured by their ends or middle portions to the part of the casing firmly connected to the projectile and engage with the opposite ends or with both ends respectively in the annular groove in the rotatable portion of the casing. Finally, pressure screws may also be provided, which act on the ends of the springs and by means of which there can be regulated the pressure of the flat springs against the rotatable part of the casing.

Owing to the comparatively large surface with which the ends of the flat springs bear against the casing portion the specific pressure is low. The undesirable "biting" action between spring and casing (steel and aluminium) is safely precluded, and an appreciable resistance can be adjusted to act against a relative rotation of the two parts of the casing, which at the same time, however, enables the parts to slide gently one against the other. Incorrect adjustments, such as occur in the known casings owing to the sudden and jerky rotation of the parts, are effectively avoided.

The invention will now be described more fully with reference to he accompanying drawing which illustrates a possible embodiment of the invention in conjunction with a casing for a mechanical time fuse.

Fig. 1 is a longitudinal section through the casing, whilst

Fig. 2 is a cross-section taken through the plane of the connecting means.

Fig. 3 is a view similar to that of Fig. 2 and illustrates a modified method of connecting the springs.

In the lower portion 1 of the fuse casing flat springs 2 are mounted by means of screws 3 in an annular groove 8, in such a manner that the free ends 4 of these springs engage in an annular groove 5 in the upper casing portion 6 and bear against the bottom of this groove. Near the free ends of the springs there are provided in the casing portion 1 radially disposed pressure screws 7, which can be actuated from the outside. This permits of adjustment of the pressure, as by means of these screws the free ends of the springs may be caused to bear with a greater or smaller pressure against the periphery of the casing portion 6. The specific pressure may be carried as desired, and thus also a greater or smaller resistance to the relative movement of the parts obtained, dependent on the adjustment of these screws and naturally also dependent on the force of the springs 2.

In contradistinction to the embodiment illustrated in Figs. 1 and 2 the springs 2 may also be so arranged that the screws 3 engage the springs approximately at the centre, so that both the free ends of each spring 2 are then acted upon by the radially disposed screws 7 (Fig. 3).

It will be understood that no restriction is made to the specific embodiments illustrated in the drawing, and that numerous modifications are quite possible within the meaning of the above description and the annexed claims without departing from the spirit of the invention.

Having now particularly described and ascertained the nature of my said invention, and in what manner the same is to be performed, I declare that what I claim is:

1. In a housing for time fuses having two interengaging parts of which one is a fixed lower portion and the other is a rotatable upper portion with corresponding annular grooves in each portion, a coupling means comprising an arcuate spring fixed at a point to one portion and lying normally in said groove in that portion, and adjusting means whereby a free portion of the spring is movable into and against the adjacent groove in the other portion.

2. A coupling means according to claim 1, in which the spring is fixed in the groove in the lower portion.

3. A coupling means according to claim 1, in which the arcuate spring is fixed near one end thereof and the adjusting means is at the other end.

4. A coupling means according to claim 1, in which a screw is provided to fix the spring in the groove and the adjusting means is in the form of a screw one of said screws being at each end of the spring.

5. A coupling means according to claim 1, in which a screw is provided to fix the spring in the groove, said screw being intermediate the ends of the spring, and the adjusting means is in the form of a screw, one of said screws being at each end of the spring.

HELMUT JUNGHANS.